Patented Dec. 18, 1951

2,578,977

UNITED STATES PATENT OFFICE 2,578,977

METHOD AND COMPOSITION FOR REDUCING THE AMOUNT OF DROSS FLOATING ON SPELTER BATH

Clark K. Lytle, Fairfield, Ala., assignor to Tennessee Coal, Iron and Railroad Company, a corporation of Alabama No Drawing. Application March 10, 1950, Serial No. 149,018

6 Claims. (Cl. 75—93)

This invention relates to the art of galvanizing metal articles by dipping in molten spelter and, in particular, to a method of facilitating the removal of dross floating on the bath and a composition useful in the performance of such method.

In the galvanizing of metal by the hot-dip process, dross accumulates on the surface of the spelter bath. This dross is composed largely of zinc oxide, the iron dissolved in the bath from the material being coated, and metallic zinc entrained therewith. If not removed periodically, it will eventually be picked up by the material being galvanized, leaving a blemish on the surface thereof. Heretofore the practice has been to skim the dross to one side of the pot containing the bath and dip it out by hand. This takes considerable labor and time during which normal operation must be suspended resulting in a loss of production.

I have discovered a method of reducing the volume of the dross accumulating on spelter baths and a composition useful therein, whereby the time and labor required for periodic skimming and dipping out the dross are materially lessened. In a preferred practice, I stir into the bath a small amount of a mixture of one or more salts such as zinc chloride and ammonium chloride with an addition of a silico-fluoride such as sodium silico-fluoride. This mixture has the effect of freeing the dross from the zinc which is entrained in it with the iron dissolved in the bath from the material passing therethrough. As a result, the dissolved iron sinks in the bath leaving only a small amount of zinc oxide floating thereon, and any small amount of aluminum present in the spelter is apparently vaporized.

A complete understanding of the invention may be obtained from the following detailed explanation of the preferred practice and the composition used therein.

In order to facilitate disposal of an accumulation of dross floating on a spelter bath after a period of use, I add to the bath a small amount of a mixture of salts effective to free the dross from zinc entrained therewith whereby the iron forming part of the dross is permitted to sink through the bath leaving only zinc oxide floating thereon for removal by skimming and dipping. The mixture preferably consists of one or more chlorides and a small addition of a silico-fluoride. More specifically, the composition is made up of from 7 to 12 parts of one or more chlorides and from $\frac{1}{10}$ to 1 part of a silico-fluoride, all proportions being by weight. The chloride may be that of zinc, ammonium or a mixture thereof. The silico-fluoride is preferably that of an alkali metal, sodium being typical. As an example of a mixture which has been found effective, the following formula is given:

| | Parts |
|---|---|
| Zinc chloride | 6–10 |
| Ammonium chloride | 1–2 |
| Sodium silico-fluoride | $\frac{1}{10}$–1 |

In practicing the method of my invention, I add a small amount of the foregoing mixture, say two ounces thereof, to the spelter bath when it shows a noticeable accumulation of dross floating therein, and then stir the bath. A vigorous reaction ensues immediately the result of which is that the volume of dross floating on the bath is materially reduced. Apparently the effect of adding the mixture of salts is to free the dross from zinc entrained therewith, thereby permitting the dissolved iron to sink through the bath because of its greater density, leaving only a relatively small amount of zinc oxide floating on the bath. This can be skimmed off readily in a very short time.

The application of the mixture of salts may be repeated as necessary. Generally, one application will serve to keep down the dross accumulation on the bath for from one to two hours, in the case of a bath having a surface of about 25 sq. ft.

In addition to reducing the labor involved in drossing a galvanizing pot, the invention also reduces the amount of dross to be reclaimed for the recovery of the zinc content, by separating from the dross the zinc which is mechanically entrained therewith.

I claim:

1. In the art of galvanizing ferrous articles by immersion in a bath of molten spelter, the step of adding to the spelter a few ounces of a mixture of from 7 to 12 parts of salts selected from the group consisting of zinc chloride and ammonium chloride and from $\frac{1}{10}$ to 1 part of a silico-fluoride of an alkali metal, thereby largely freeing the dross from entrained zinc and iron and permitting the latter to sink through the spelter bath.

2. In the art of galvanizing ferrous articles by immersion in a bath of molten spelter, the step of adding to the spelter a few ounces of a mixture of from 6 to 10 parts of zinc chloride, from 1 to 2 parts of ammonium chloride and from $\frac{1}{10}$ to 1 part of a silico-fluoride of an alkali metal, thereby largely freeing the dross from entrained zinc and iron and permitting the latter to sink through the spelter bath.

3. In the art of galvanizing ferrous articles by immersion in a bath of molten spelter, the step of adding to the spelter a few ounces of a mixture of from 6 to 10 parts of zinc chloride, from 1 to 2 parts of ammonium chloride and from $\frac{1}{10}$ to 1 part of sodium silico-fluoride, thereby largely freeing the dross from entrained zinc and iron and permitting the latter to sink through the spelter bath.

4. A composition for addition to a spelter bath effective to free entrained zinc from iron dissolved in the bath, said composition consisting of from 7 to 12 parts of chlorides selected from the group consisting of zinc chloride and ammonium chloride and from $\frac{1}{10}$ to 1 part of a silico-fluoride of an alkali metal.

5. A composition for addition to a spelter bath effective to free entrained zinc from iron dissolved in the bath, said composition consisting of from 6 to 10 parts of zinc chloride, from 1 to 2 parts of ammonium chloride and from $\frac{1}{10}$ to 1 part of a silico-fluoride of an alkali metal.

6. A composition for addition to a spelter bath effective to free entrained zinc from iron dissolved in the bath, said composition consisting of from 6 to 10 parts of zinc chloride, from 1 to 2 parts of ammonium chloride and from $\frac{1}{10}$ to 1 part of sodium silico-fluoride.

CLARK K. LYTLE.

REFERENCES CITED

The following references are of record in the file of this patent:

UNITED STATES PATENTS

| Number | Name | Date |
|---|---|---|
| 1,914,269 | Liban | June 13, 1933 |
| 1,970,136 | Gummert | Aug. 14, 1934 |
| 2,131,549 | Claus | Sept. 27, 1938 |
| 2,179,258 | Howarth | Nov. 7, 1939 |

FOREIGN PATENTS

| Number | Country | Date |
|---|---|---|
| 274,693 | Great Britain | July 28, 1927 |

OTHER REFERENCES

Uses and Applications of Chemicals and Related Materials by Gregory, vol. II, published by Reinhold Publishing Corp., 1944, page 305.